(12) United States Patent
Yamaura

(10) Patent No.: US 6,633,836 B1
(45) Date of Patent: Oct. 14, 2003

(54) DESIGN SYSTEM, DESIGN METHOD, AND STORAGE MEDIUM STORING DESIGN PROGRAM FOR STRUCTURAL ANALYSIS AFTER AMENDMENT OF MODEL FORM

(75) Inventor: Kazuya Yamaura, San Jose, CA (US)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/515,666

(22) Filed: Feb. 29, 2000

(30) Foreign Application Priority Data

Mar. 18, 1999 (JP) .......................................... 11-074594

(51) Int. Cl.⁷ .............................................. G06F 17/50
(52) U.S. Cl. ............................... 703/2; 703/7; 345/423; 345/428
(58) Field of Search ........................ 703/2, 7; 345/428, 345/421, 420, 423

(56) References Cited

U.S. PATENT DOCUMENTS

| | | | | |
|---|---|---|---|---|
| 5,280,547 A | * | 1/1994 | Mahoney | .................... 382/49 |
| 5,752,068 A | * | 5/1998 | Gilbert | .................. 395/800.16 |
| 5,905,507 A | * | 5/1999 | Rossignac et al. | .......... 345/440 |
| 6,307,964 B1 | * | 10/2001 | Lin et al. | ..................... 382/203 |
| 6,426,750 B1 | * | 7/2002 | Hoppe | ........................ 345/428 |
| 6,445,390 B1 | * | 9/2002 | Aftosmis et al. | ........... 345/421 |

* cited by examiner

*Primary Examiner*—Samuel Broda
*Assistant Examiner*—T. Phan
(74) *Attorney, Agent, or Firm*—Staas & Halsey LLP

(57) ABSTRACT

A system includes a unit for dividing a model in mesh units; a unit for generating and displaying a child edge as a new edge from a parent edge obtained by dividing the model in mesh units; a unit for amending the displayed child edge into an optional form; a unit for obtaining correspondence between the parent edge and the amended child edge; and a unit for analyzing structure of an amended model form determined based on the obtained correspondence. With the configuration, a structural analysis can be quickly performed in a simple operation by dividing a model into mesh units, specifying a child edge of an optional curve in a parent edge, projecting the parent edge into the child edge, automatically computing the coordinates, and obtaining the optimum solution in a structural analysis based on the computation.

7 Claims, 11 Drawing Sheets

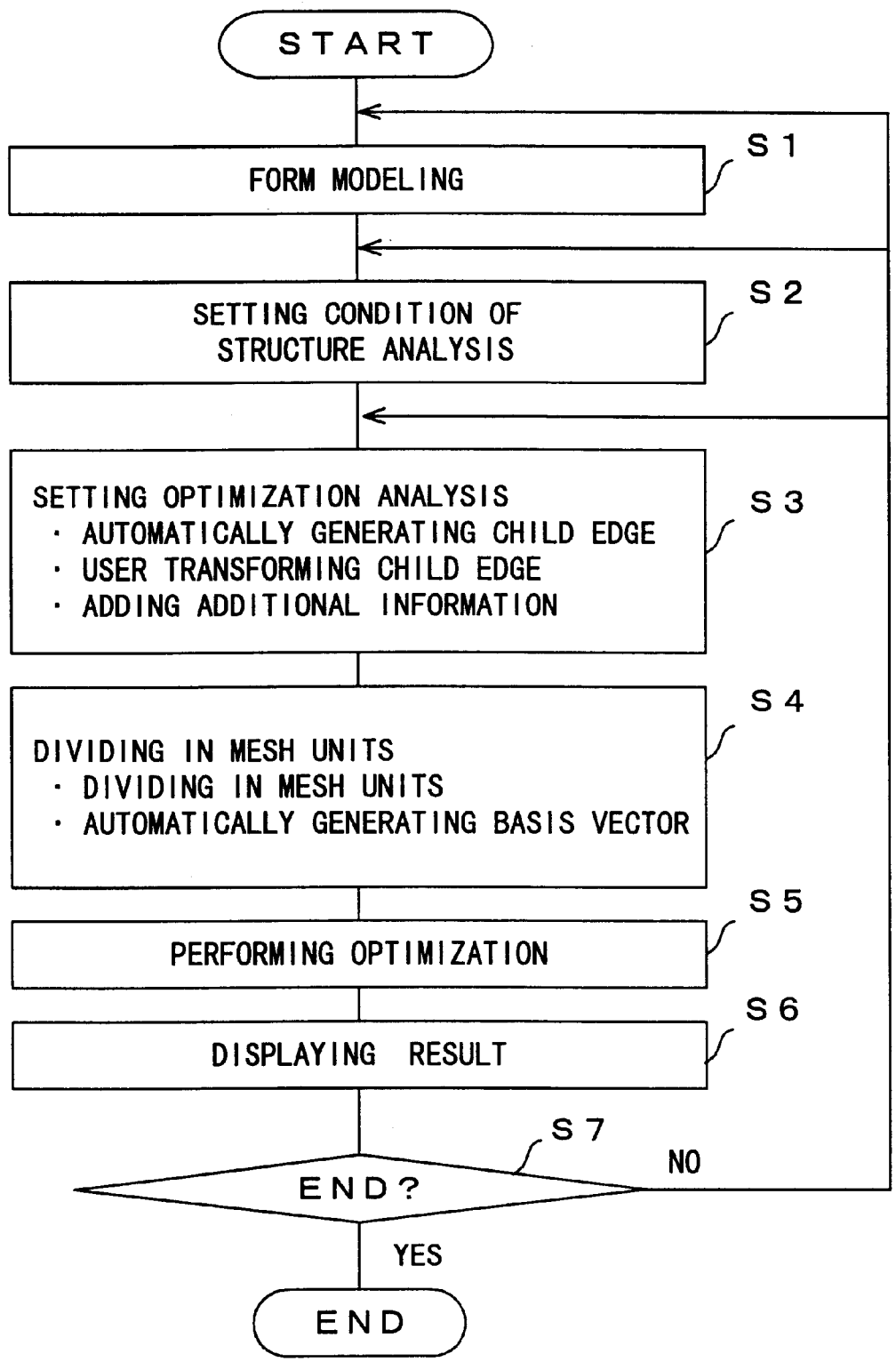
F I G. 2 B (a) FORM (OPTIMIZATION EXAMPLE)
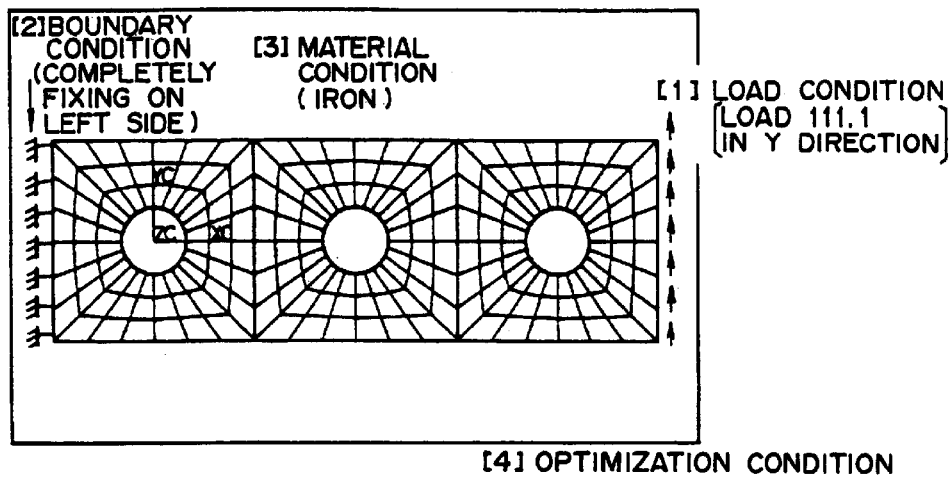
(b) BASIS VECTOR
(b-1) EXPANDING DIAMETER OF HOLE
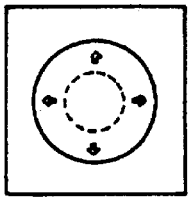
(b-2) EXPANDING HOLE IN HORIZONTAL DIRECTION
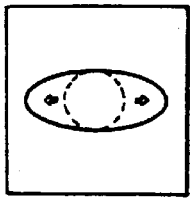
(b-3) EXPANDING INTO RECTANGULAR HOLE
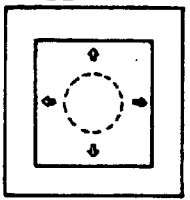
(c) FORM (CONVERGING AFTER 10 REPETITIVE COMPUTATION)
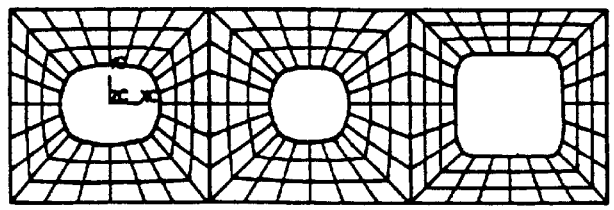
$$\begin{bmatrix} \text{VOLUME AFTER} \\ \text{OPTIMIZATION} \\ = 0.999 \times 10^4 \end{bmatrix}$$
FIG. 8

DESIGN SYSTEM, DESIGN METHOD, AND STORAGE MEDIUM STORING DESIGN PROGRAM FOR STRUCTURAL ANALYSIS AFTER AMENDMENT OF MODEL FORM

BACKGROUND OF THE INVENTION

1. Field of the Invention

The present invention relates to a design system, a design method, and a storage medium storing a design program for a structural analysis after amending the form of a model.

2. Description of the Related Art

Conventionally, when a desirable model form is obtained to minimize the weight while maintaining the strength in analyzing a structure, a plurality of candidates for a desirable form (basis vector) are defined, and then the form (a) is divided into mesh units as shown in FIG. 1 into the form (b). Then, in a manual operation, as indicated by the form (c), the coordinate indicated by a small circle (○) of a node on each of the edges (sides) of the divided mesh units is manually input (by specifying the x, y, and Z coordinates) and amended. A structural analysis is made on a model formed based on the amended edge according to the well-known boundary conditions and the attribute (strength, weight, etc.) of a material to obtain the optimum solution satisfying a predetermined strength, for example, a model form lightest in weight.

When the above described optimization is performed, it is necessary to divide a model into mesh units, and manually associate a node on each edge (side) with a coordinate value as shown by (c) in FIG. 1. If the number of nodes is large, then a great number of manual operations are required, thereby preventing a quick structural analysis.

SUMMARY OF THE INVENTION

To solve the above described problems, the present invention aims at quickly performing a structural analysis in a simple operation by dividing a model into mesh units, specifying a child edge of an optional curve in a parent edge, projecting the parent edge into the child edge, automatically computing the coordinates, and obtaining the optimum solution in a structural analysis based on the computation.

According to the first aspect of the present invention, the design system which analyzes a structure by amending the form of a model includes: a mesh division unit for dividing the model into mesh units; a child edge generation and display unit for generating and displaying a child edge, which is newer than a parent edge divided into mesh units; an amendment unit for amending the displayed child edge into an optional form, an association unit for obtaining the correspondence between the above described parent unit and the amended child unit; and a structural analysis unit for analyzing the structure of the amended model form depending on the obtained correspondence.

BRIEF DESCRIPTION OF THE DRAWINGS

FIG. 2B is a flowchart of the operation according to the present invention;

FIG. 8 is an explanatory view of the present invention;

DESCRIPTION OF THE PREFERRED EMBODIMENTS

The embodiments of the present invention are described below in detail by referring to the attached drawings.

The present invention includes the following units to solve the above described problems.

The units for solving the problems are described below by referring to FIG. 2A.

Figure 1:
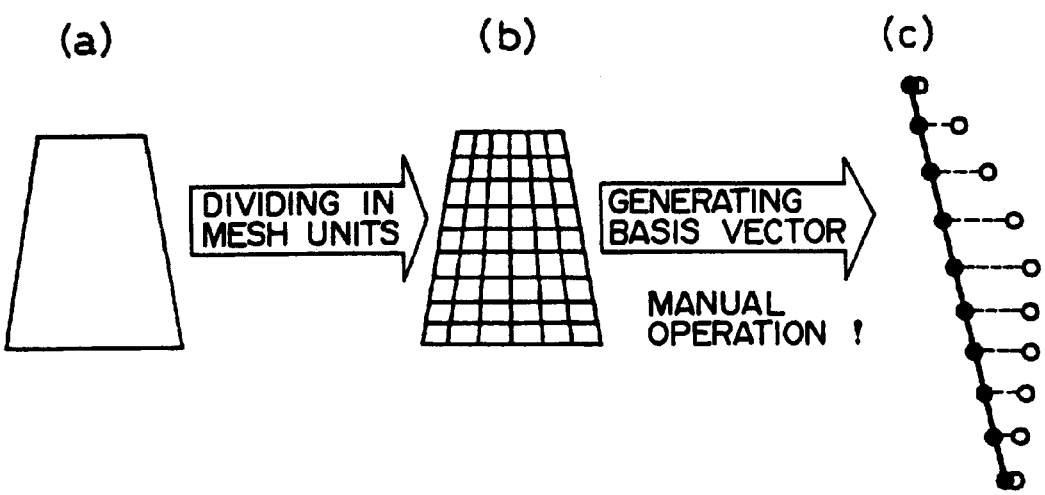
FIG. 1 shows the conventional technology.
Figure 2A:
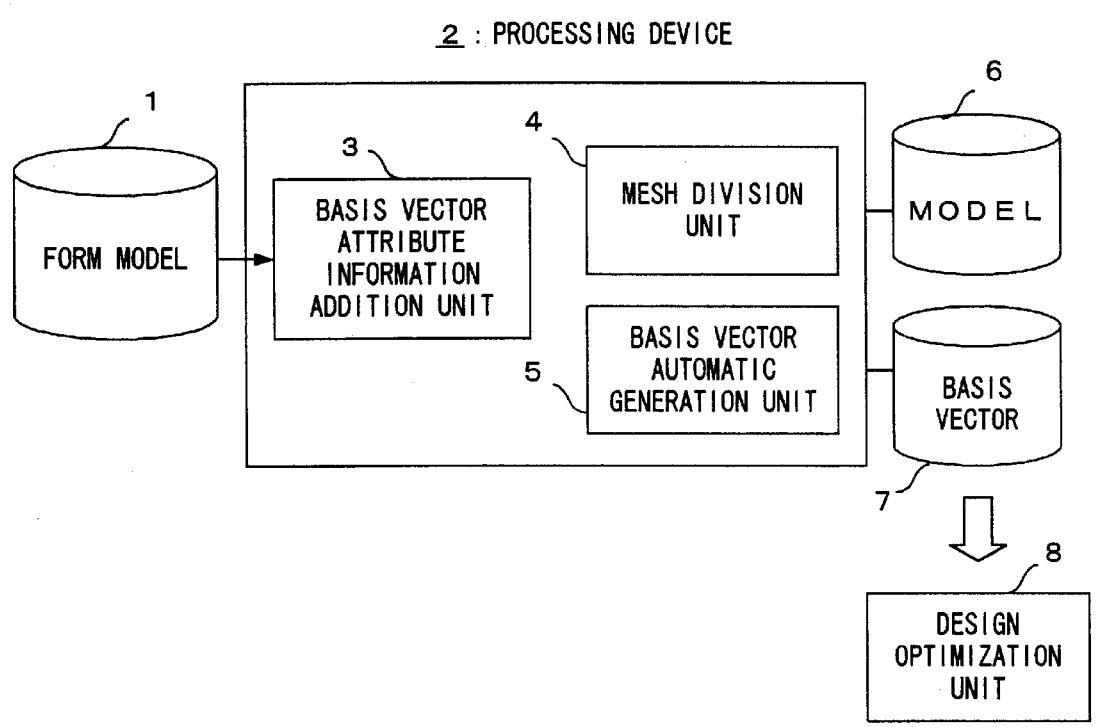
FIG. 2A shows the configuration of the system according to the present invention.

In FIG. 2A, a processing device 2 performs various processes according to a program. In this example, the processing device 2 comprises a mesh division unit 4 and a basis vector automatic generation unit 5.

The mesh division unit 4 divides a model into mesh units.

The basis vector automatic generation unit 5 amends a child edge obtained by copying a parent edge obtained by dividing a model into mesh units, projects the parent edge into the child edge, obtains the correspondence between them, and automatically generates a basis vector.

A design optimization unit 8 optimizes a design based on a basis vector.

Described below is an operation.

If the mesh division unit 4 divides a model into mesh units, the basis vector automatic generation unit 5 copies and displays the edge (referred to as a parent edge) obtained by the basis vector automatic generation unit 5 dividing the model into mesh units, and the displayed edge (referred to as a child edge) is amended into an optional form, then the parent edge is projected into the amended child edge to obtain the correspondence and generate a basis vector, and the design is optimized based on the basis vector generated by the design optimization unit 8.

At this time, the child edge is displayed corresponding to the parent edge to easily recognize the correspondence.

In addition, the projection can be performed as parallel projection, radial projection, or projection from one point to obtain the correspondence.

Furthermore, a child edge displayed on the display is amended into an optional form, or a child edge can be amended into an optional form by specifying a function.

Therefore, when a child edge formed by an optional curve from the parent edge obtained by dividing a model in mesh units is specified, a coordinate computing process is automatically performed by projecting the parent edge into the child edge. Based on the computation result, the structure is analyzed and the optimum solution can be obtained, thereby realizing an amendment to a model form in a simple operation and quickly analyzing the structure.

Next, the embodiments and the operations of the present invention are sequentially described below in detail by referring to FIGS. 2A through 8.

FIG. 2A shows the configuration of the system of the present invention.

Figure 5:
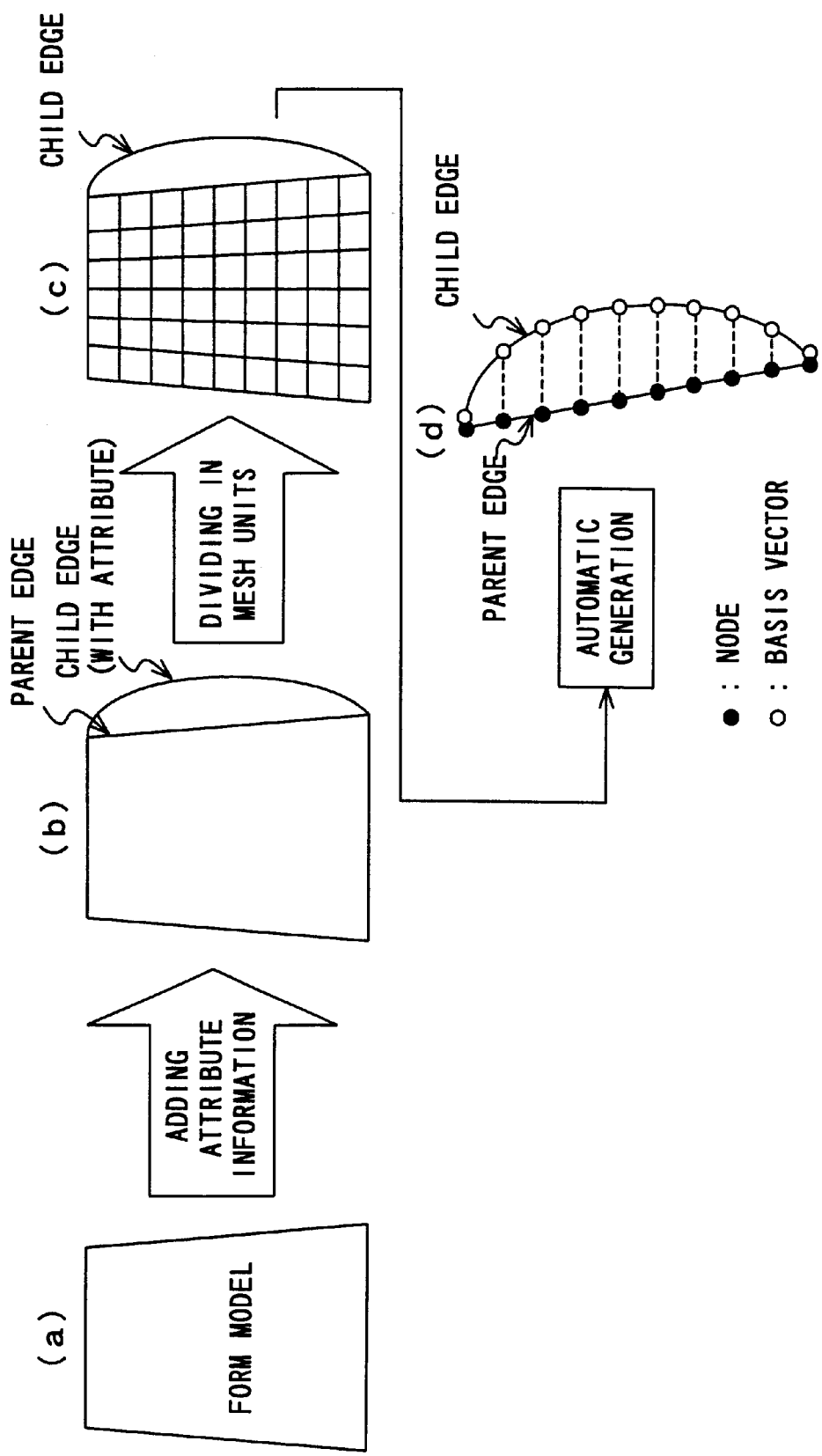
FIG. 5 is an explanatory view of the present invention.

In FIG. 2A, a form model 1 is a three-dimensional form model generated by the CAD, and indicates the object as shown by (c) in FIG. 5 and by (a) in FIG. 8.

The processing device 2 loads a program read from a storage medium not shown in FIG. 2A onto the main storage, activates the program, and performs various processes described below. In this example, the processing device 2 comprises a basis vector attribute information addition unit 3, the mesh division unit 4, the basis vector automatic generation unit 5, etc.

The basis vector attribute information addition unit 3 adds various attribute information of the basis vector representing a model.

The mesh division unit 4 divides a form model in mesh units.

The basis vector automatic generation unit 5 displays a child edge copied from a parent edge obtained by dividing a form model in mesh units, amends a displayed child edge, generates a basis vector by projecting a parent edge into a child edge to obtain the correspondence between them, etc. (refer to FIGS. 2B, 3, and 4).

The operation with the configuration shown in FIG. 2A are described below in detail in the order shown in the flowchart in FIG. 2B.

FIG. 2B is a flowchart of the operations according to the present invention.

In FIG. 2B, a form modeling process is performed in step S1. That is, a model of a three-dimensional object is generated by the CAD.

In step S2, the condition of a structure analysis is set. For example, a boundary condition, the designation of a material, etc. can be set.

In step S3, the optimization conditions is set in the following processes.

automatically generating a child edge;

transforming a child edge by the user;

adding attribute information; etc.

In the process of automatically generating a child edge, a copy of the parent edge shown by (b) in FIG. 5 (obtained by dividing a model in mesh units) is displayed as a child edge corresponding to the parent edge (having the same form as the parent edge). In the process of transforming a child edge by the user, a child edge is transformed as a convex side on the right using a mouse, etc. as shown by (b) in FIG. 5. In the process of adding attribute information, an attribute of a child edge different from that of its parent edge, or a new attribute is added to the child edge as attribute information.

In step S4, a model is divided in mesh units in the following processes.

dividing a model in mesh units automatically generating a basis vector, etc.

In the process of dividing a model in mesh units, a model is divided in mesh units as shown by (c) in FIG. 5 as described below. In the process of automatically generating a basis vector, a basis vector is automatically generated as shown by (d) in FIG. 5 according to the flowchart shown in FIG. 4 described later.

In step S5, an optimizing process is performed. That is, optimization computation is performed based on the basis vector automatically generated in step S4 (the optimum form is determined based on a boundary condition, the characteristic of a material, etc.).

In step S6, the result of the optimizing process in step S5 is displayed. For example, as shown by (c) in FIG. 8 described later, the form of the result obtained in the optimization computation is displayed.

In step S7, it is determined whether or not the process terminates (whether or not a satisfactory form has been obtained). If YES, the process terminates. If NO, control is returned to step S1, the form of the model is changed, and the processes in and after step S2 are performed, or control is returned to step S2, the condition of the structure analysis is changed, and the processes in and after step S3 are performed, or control is returned to step S3, the optimum condition is changed, and the processes in and after step S4 are performed.

As described above, a form model is divided in mesh units, a child edge is displayed correspondingly as a copy of a parent edge, a basis vector is automatically generated corresponding to the transformation of the child edge, the optimization computation is performed based on the generation, and the resultant form is displayed. By repeating the above described processes, a form having a predetermined strength and the optimum value (smallest volume) can be designed.

Figure 3:
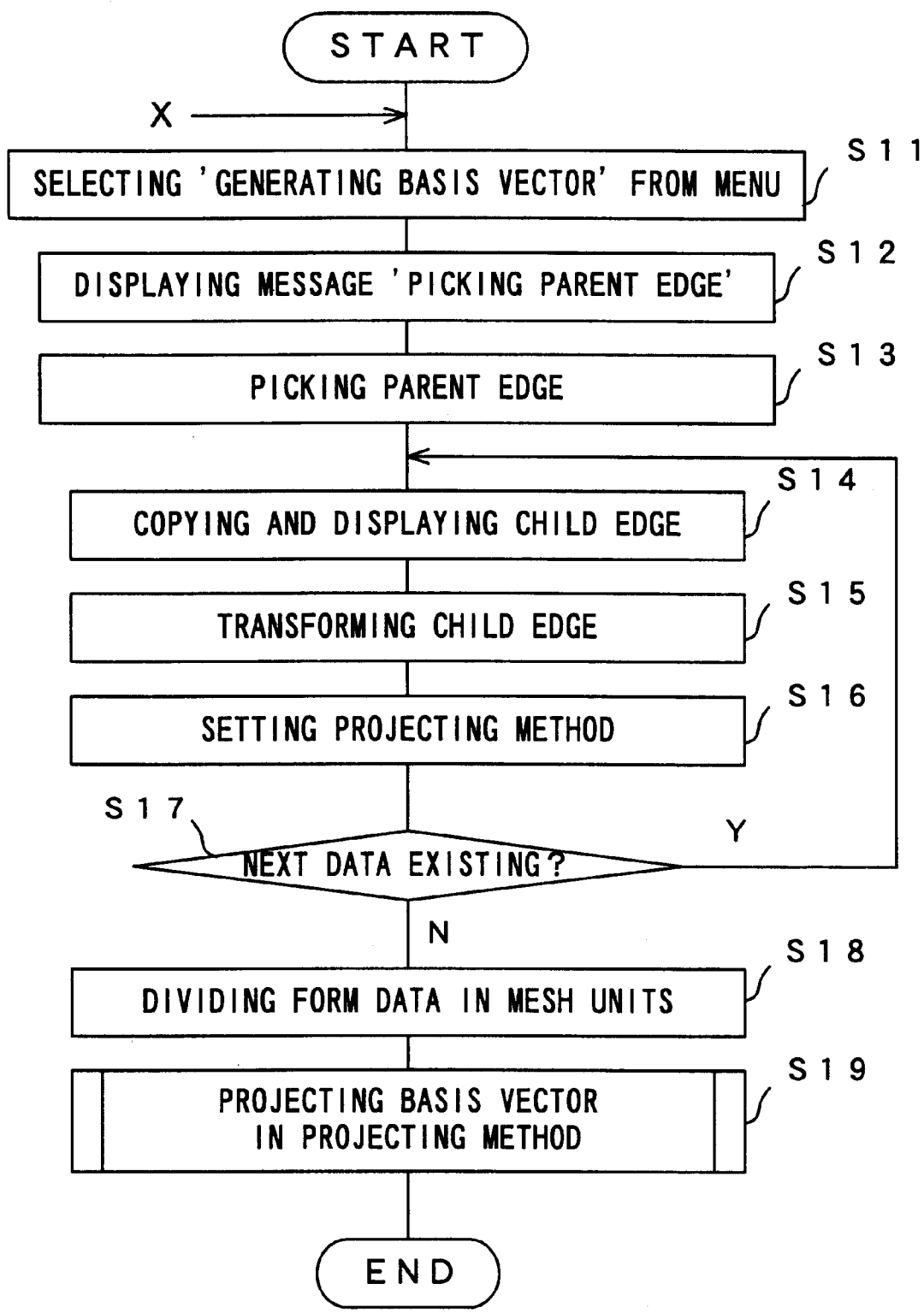
FIG. 3 is a flowchart 1 for explanation of the detailed operations according to the present invention.

FIG. 3 is a flowchart (1) of the detailed operation according to the present invention.

In FIG. 3, the 'basis vector' is selected from the menu in step S11.

In step S12, the message 'picking the parent edge' is displayed.

In step S13, the parent edge is picked.

In step S14, the child edge is copied and displayed.

In step S15, the child edge is transformed. In the steps S11 through S15, if the 'basis vector' is selected using a mouse on the menu screen, and the parent edge displayed, for example, by (b) in FIG. 5 described later, is clicked and selected using the mouse in response to the message 'picking the parent edge, then the copied child edge is displayed, thereby displaying the copied child edge. As a result, the displayed child edge is transformed, for example, as shown in the figure.

In step S16, the projecting method is set. In this step, the method of projecting a parent edge into a child edge and obtaining the correspondence is set. For example, one of the following methods is set.

parallel in the Y direction radiation radiation from one point other projecting methods In step S17, it is determined whether or not there is a next object. If YES, control is returned to step S14, and the processes are repeated. If NO, control is passed to step S18.

In step S18, form data is divided in mesh units.

In step S19, a basis vector is projected in the projecting method. Thus, in the projecting method set in step S16, the node number of the parent edge is associated with the coordinates of the child edge in the procedure in steps S21 through S27 shown in FIG. 4 as described later.

As described above, the parent edge and the optionally transformed child edge can be stored after being associated with each other.

Figure 4:
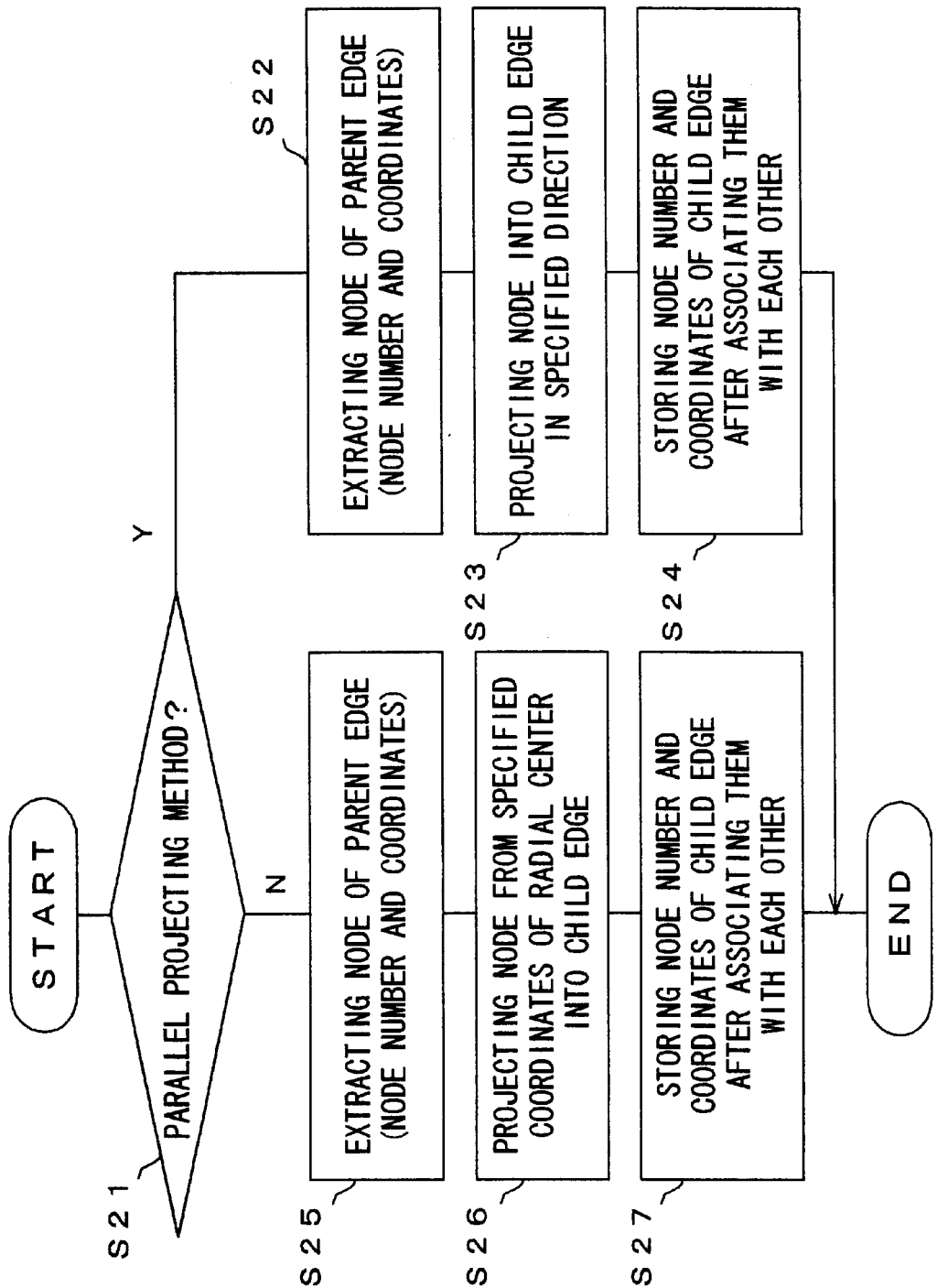
FIG. 4 is a flowchart 2 for explanation of the detailed operations according to the present invention.

FIG. 4 is a flowchart (2) of the detailed operations according to the present invention. It is the flowchart of the detailed operations in step S19 shown in FIG. 3 described above.

In FIG. 4, it is determined whether or not the projecting method is a parallel method. If YES, the parent edge is associated with the child edge by the parallel projecting method in steps S22 through S24. If NO, the parent edge is associated with the child edge by the projecting method specified in steps S25 through S27.

In step S22, a node of the parent edge is extracted. In this step, the node number and the coordinates of the node of the parent edge are extracted.

In step S23, the node is projected into the child edge in a specified direction. That is, the node of the parent edge is projected into the child edge in parallel in the specified direction.

In step S24, the node number and the coordinates of the child edge are stored after being associated with each other.

If the determination in step S21 is YES, then in steps S22 through S24, the node of the parent edge is projected into the child edge in parallel in the specified direction, and the node number of the parent edge and the coordinates of the corresponding point of the projected child edge are stored after being associated with each other, thereby storing the parent edge and the child edge after associating them with each other.

In step S25, a node of the parent edge is extracted. In this step, the node number and the coordinates of the node of the parent edge are extracted.

In step S26, the node is projected from the coordinates of the specified radiation center into the child edge. That is, the node of the parent edge is radiated from the coordinates of the specified radiation center into the child edge.

In step S27, the node number and the coordinates of the child edge are stored after being associated with each other.

If the determination in step S21 is NO, then in steps S25 through S27, the node of the parent edge is projected into the child edge from the specified coordinates of the radiation center into the child edge, the node number of the node of the parent edge and the coordinates of the corresponding projected point of the child edge are stored after being associated with each other, thereby storing the parent edge and the child edge after associating them with each other.

FIG. 5 is an explanatory view of the present invention.

In FIG. 5, (a) shows an example of a form model. Attribute information is added to the form model.

In FIG. 5, (b) shows that a parent edge is copied to generate a child edge, and then transform the child edge. In this example, the child edge obtained by copying the parent edge is transformed by being curved right. At this time, attribute information of the parent edge can be transformed and added to the child edge, or new attribute information can be added to the child edge.

In FIG. 5, (c) shows the division in mesh units, and the state of the displayed child edge.

In FIG. 5, (d) shows the node of the parent edge projected in parallel into the child edge. In this example, a black dot indicates a node of the parent edge while a white dot indicates the node of the parent edge projected in parallel into the child edge. The relationship between them can be stored by associating the node number of the parent edge with the coordinates of the child edge.

As described above, a child edge copied from a parent edge obtained by dividing a form model in mesh units is displayed. In response to the transformation of the child edge, the node of the parent edge is projected into the child edge, and the node number of the parent edge and the projected coordinates into the child edge are stored after being associated with each other, thereby generating a candidate model (basis vector) transformed into an optional form in a simple operation.

Figure 6:
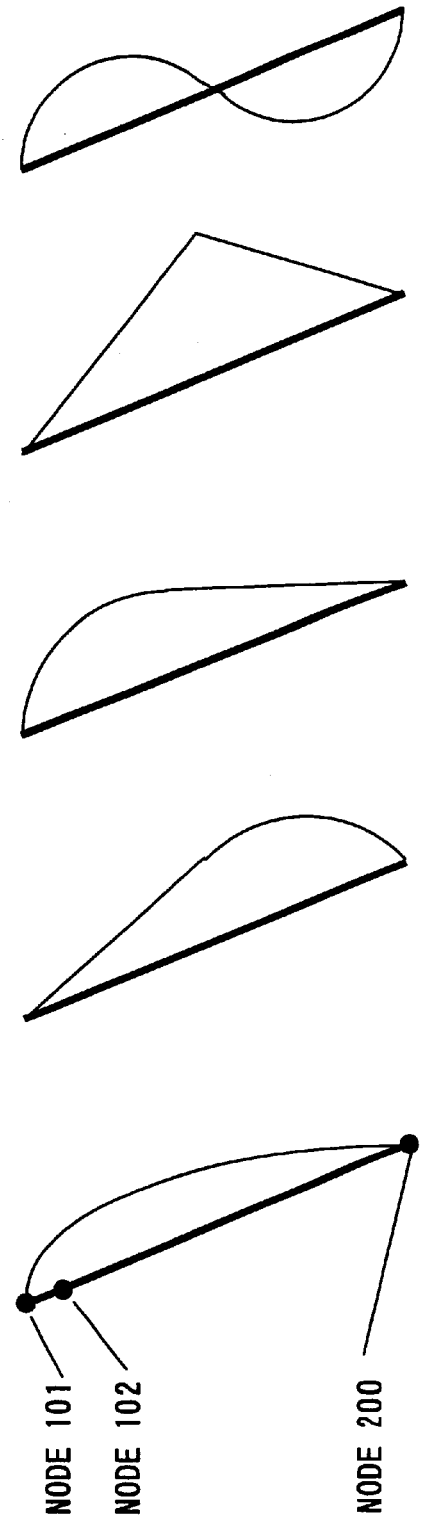
FIG. 6 shows an example of the comparison of the numbers of times of operations.

FIG. 6 shows an example of comparing the times of operations.

In FIG. 6, (a) shows the case in which the basis vectors in five patterns are defined for the portion of a number of nodes 100. In this example, there are a parent edge on the left side in bold lines and a child edge on the right in fine lines, and 100 nodes from node 101 to node 200 of the parent edge are associated with the child edge.

In FIG. 6, (b) shows an example of comparing the times of user operations (manual work).

In FIG. 6, (b-1) shows an example of computing the times of the operations in the conventional method.

100 times of the operation of generating a basis vector configuration point from the node of a parent edge×5 patterns=500 times of the operation are required. Since the coordinates of the corresponding points (basis vector configuration points) to a transformed form corresponding to the nodes (100 for 1 pattern) of the parent edge are manually set as described above in the description of the related art, 100 times of specifying coordinates (entering coordinates) are required for 1 pattern. As a result, a total of 500 times of operations are required for 5 patterns.

In FIG. 6, (b-2) shows an example of computing the number of operations according to the present invention.

(1 time of operation of generating a child edge+one time of operation of generating a form by the CAD modeling function (generating a form of a child edge))×5 patterns=10 times of operations Therefore, 500 times of manual operations in the conventional technology can be reduced to 10 times of operations according to the present invention. As a result, the times of operations by the operator can be considerably reduced, a large number of candidate models (basis vectors) of different pattern forms can be easily, quickly, and automatically generated for the optimum design.

Figure 7:
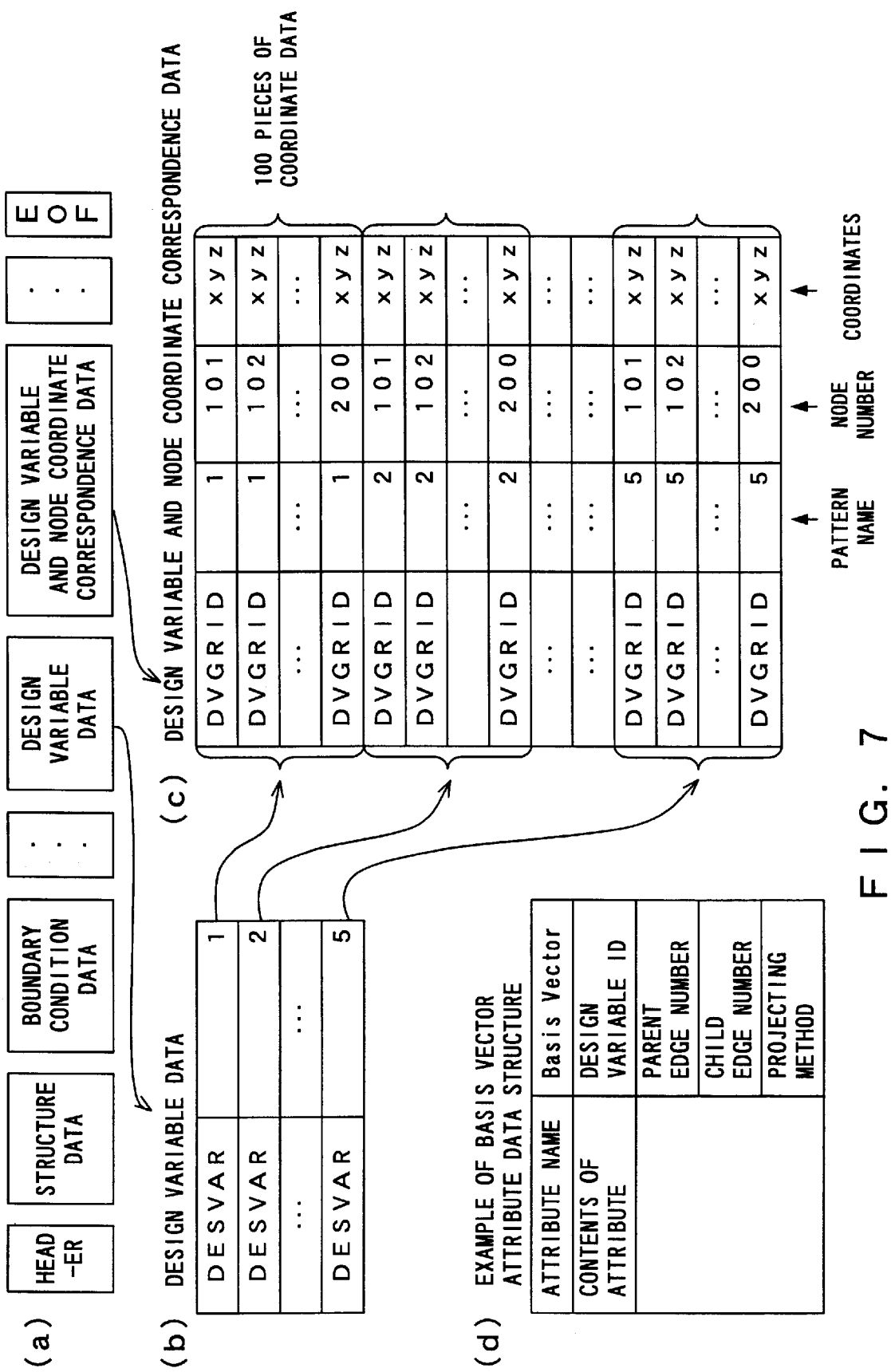
FIG. 7 shows an example of the data structure necessary to optimize the design of the present invention.

FIG. 7 shows an example of the data structure necessary to optimize the design according to the present invention.

In FIG. 7, (a) shows an example of the whole data structure.

header structure data boundary condition data design variable data design variable and node coordinate correspondence data others where the header indicates the information about the name, etc. of data. The structure data indicates a three-dimensional form. The boundary condition data sets the boundary condition of a three-dimensional form represented by the structure data. The design variable data sets the pattern information (for example, the above described information of the patterns 1, 2, 3, 4, and 5 shown by (a) in FIG. 6) obtained by transforming the form as shown by (b) in FIG. 7. A design variable and node coordinate correspondence data sets the node number of a parent edge and the coordinates of a child edge as being associated with each other as shown by (c) in FIG. 7. In this example, the above described five patterns shown by (a) in FIG. 6 are set as shown by (b) in FIG. 7.

In FIG. 7, (c) shows an example of a design variable and node coordinate correspondence data. In this example, as indicated by an arrow, 100 node numbers of a parent edge for each of the five patterns and the coordinates of a child edge are set after being associated with each other.

In FIG. 7, (d) shows an example of a basis vector attribute data structure. In this example, the following attribute data is set.

attribute name:
  Basis Vector
attribute contents:
  design variable ID parent edge number
child edge number
projecting method FIG. 8 is an explanatory view of the present invention.

In FIG. 8, (a) shows the form (model) before the optimization. By (a) in FIG. 8, the conditions are set as follows.

[1] load condition: The load of 111.1 is added to the right end in the upward direction (Y direction).

[2] boundary condition: The left end is completely fixed.

[3] material condition: Use iron.

[4] optimization condition: The volume is minimized with the maximum shearing stress of all elements being equal to or lower than 90.0 (volume before optimization: $1.974 \times 10^4$)

In FIG. 8, (b) shows an example of a basis vector.

In FIG. 8, (b-1) shows an example of a basis vector in which the hole in dotted line is expanded to the hole in solid line.

In FIG. 8, (b-2) shows an example of a basis vector in which the hole in dotted line is expanded in the horizontal direction as indicated by the solid line.

In FIG. 8, (b-3) shows an example of a basis vector in which the hole in dotted line is expanded to the rectangular hole. By (b-1) through (b-3) in FIG. 8, the holes are expanded, but it is obvious that they can be reduced.

In FIG. 8, (c) shows an example of a form after the optimization converging through 10 times of repetitive operations performed on the form before the optimization shown by (a) in FIG. 8 based on the basis vector shown by (b-1) through (b-3) in FIG. 8. In this case, the optimization is performed on the form as shown by (c) in FIG. 8. The volume after the optimization is $0.999 \times 10^4$ as shown by (c) in FIG. 8.

As described above, according to the present invention, if a child edge formed of an optional curve is specified for the parent edge obtained by dividing a model in mesh units, then the parent edge is projected into the child edge, and the coordinates are automatically computed. Based on the result, the structure is analyzed to obtain the optimum solution. Therefore, a candidate model (basis vector) is generated in a simple operation, thereby realizing a quick structure analysis. As a result, the following process can be performed.

(1) A plurality of child edges can be easily defined (set) for a parent edge.

(2) A child edge can be easily transformed using a CAD modeling command, etc., thereby automatically generating a basis vector which conventionally requires laborious steps.

It is obvious that the present invention can be applied to any system, regardless of a single device, a plurality of devices, or an integrated device, performing a process through a network such as a LAN, a WAN, etc. as long as the functions of the present invention can be performed.

Figure 9:
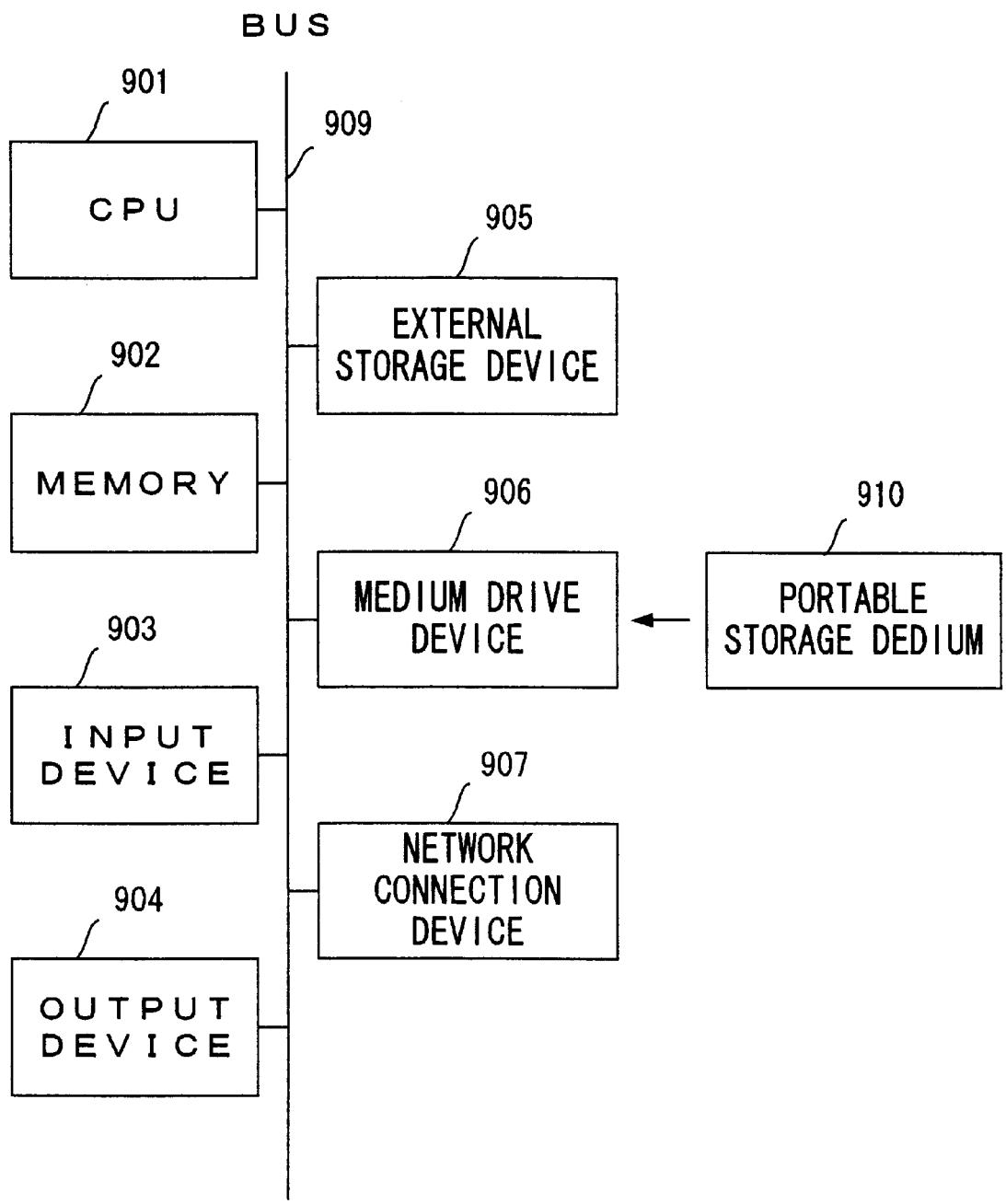
FIG. 9 shows the configuration of an information processing device.

As shown in FIG. 9, a system comprising a CPU 901, memory 902 such as ROM and RAM, an input device 903, an output device 904, an external storage device 905, a medium drive device 906, a portable storage medium 910, and a network connection device 907 connected through a bus 909 can be realized. That is, the memory 902 such as ROM and RAM, the external storage device 905, and the bus 909 storing a program code of the software for realizing the system according to the above described embodiments are provided for a system or a device. The computer (or the CPU 901 and the MPU) of the system or the device can also read and execute the program code to realize the present invention.

In this case, the program code read from the storage medium realizes a new function of the present invention, and the portable storage medium 910, etc. storing the program code forms part of the present invention.

The portable storage medium 910 for providing a program code can be, for example, a floppy disk, a hard disk, an optical disk, a magneto-optical disk, CD-ROM, CD-R, DVD-ROM, DVD-RAM, a magnetic tape, a nonvolatile memory card, a ROM card, various storage media connected through the network connection device 907 (that is, a communications lines) for electronic mail, communications through personal computers, etc.

Figure 10:
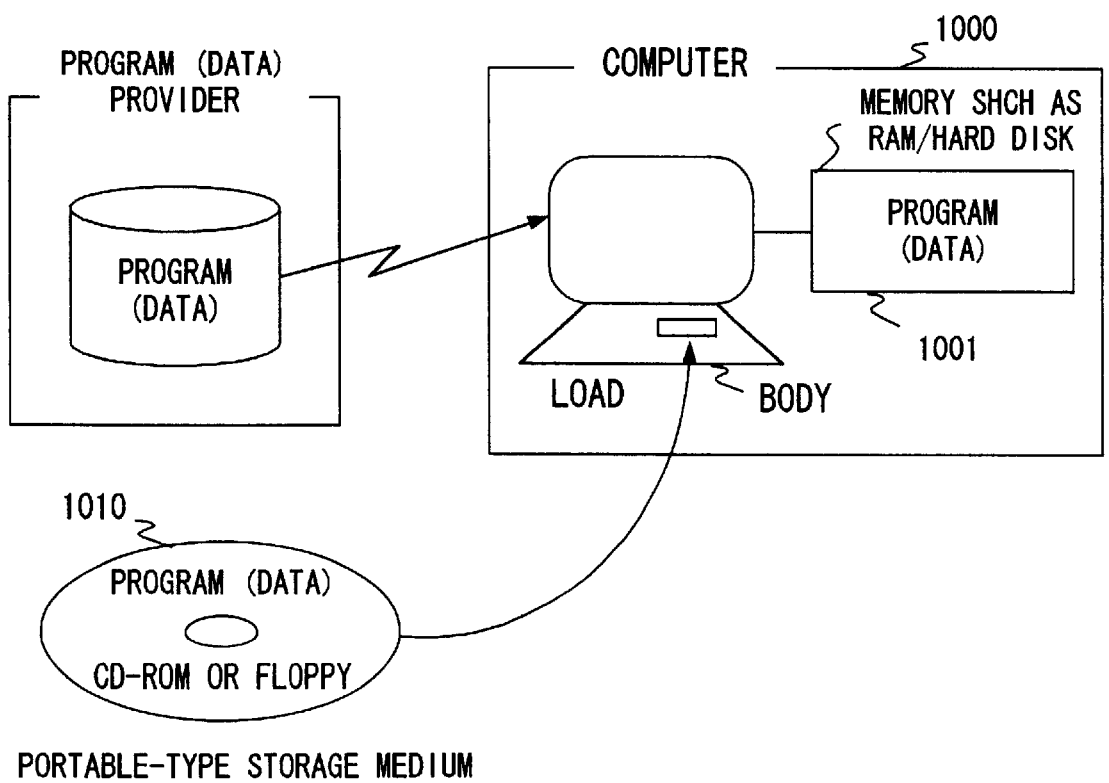
FIG. 10 shows the configuration of the system.

As shown in FIG. 10, the functions according to the above described embodiments can be realized by executing the program code read by a computer 1000 to memory 1001. In addition, at an instruction of the program code, the OS, etc. operating in the computer 1000 can perform a part or all of the actual processes through which the functions according to the above described embodiments can be performed.

Furthermore, after a program code read from a portable storage medium 1010 is written to the memory provided in a function extension board inserted in the computer 1000 or a function extension unit connected to a computer, the CPU, etc. provided in the function extension board or the function extension unit performs at the instruction of the program code a part or all of the actual processes through which the functions according to the above described embodiments can be realized.

What is claimed is:

1. A designing system conducting a structure analysis of an original model by modifying the shape of the model, comprising:

a meshing unit meshing the original model;

a child edge generation and display unit generating a child edge, which is the same in shape and location with a parent edge representing an edge of the original model, and displaying the child edge on a display screen;

a modification unit modifying the shape of the displayed child edge according to an interactive input made by an operator;

a correspondence unit projecting nodes of the parent edge, which result from the meshing performed by the meshing unit, onto the modified child edge and correlating coordinates of the nodes with those of the corresponding projected points respectively to obtain a correspondence relationship between the parent edge and the modified child edge; and a structure analysis unit conducting a structure analysis of the model, of which the shape is modified, in a manner as specified by the correspondence relationship obtained by the correspondence unit.

2. The designing system according to claim 1, wherein said correspondence unit obtains the correspondence relation by projecting all of the nodes in parallel, radially, or from one point onto the modified child edge.

3. The designing system according to claim 1, wherein said modification unit modifies the shape of the child edge displayed on the screen in a manner as specified by an operator using a mouse or by a mathematical function an operator selects.

4. A computer-readable storage medium storing a designing program to direct a computer to conduct a structure analysis of an original model by modifying the shape of the model, the designing program, comprising:

meshing the original model;

generating a child edge, which is the same in shape and location with a parent edge representing an edge of the original model, and displaying the child edge on a display screen;

modifying shape of the displayed child edge according to an interactive input made by an operator;

projecting nodes on the parent edge, which result from the meshing, onto the modified child edge and correlating coordinates of the nodes with those of the corresponding projected points respectively to obtain a correspondence relationship between the parent edge and the modified child edge; and conducting a structure analysis of the model, of which the shape is modified, in a manner as specified by the correspondence relationship.

5. A designing method for conducting a structure analysis of an original model by modifying shape of the model, comprising:

meshing the original model;

generating a child edge, which is the same in shape and location with a parent edge representing an edge of the original model, and displaying the child edge on a display screen;

modifying the shape of the displayed child edge according to an interactive input made by an operator;

projecting nodes on the parent edge, which result from the meshing, onto the modified child edge and correlating coordinates of the nodes with those of the corresponding projected points respectively to obtain a correspondence relationship between the parent edge and the modified child edge; and conducting a structure analysis of the model, of which the shape is modified, in a manner as specified by the correspondence relationship.

6. A designing system conducting a structure analysis of an original model by modifying the shape of the model, comprising:

a meshing means for meshing the original model;

a child edge generation and display means for generating a child edge, which is the same in shape and location with a parent edge representing an edge of the original model, and displaying the child edge on a display screen;

a modification means for modifying shape of the displayed child edge according to an interactive input made by an operator;

a correspondence means projecting nodes on the parent edge, which result from the meshing performed by the meshing means, onto the modified child edge and correlating coordinates of the nodes with those of the corresponding projected points respectively to obtain a correspondence relationship between the parent edge and the modified child edge; and a structure analysis means for conducting a structure analysis of the model, of which the shape is modified, in a manner as specified by the correspondence relationship obtained by the correspondence means.

7. A method of structurally analyzing a form model comprising an original edge with endpoints, the method comprising:

interactively creating a modified edge of the form model that has endpoints coincident with the endpoints of the original edge of the form model and having a shape different than the shape of the original edge of the form model;

creating a discretization of the original edge, the discretization comprising nodes on the original edge of the form model;

based on the discretization of the original edge of the form model, automatically generating a corresponding discretization of the modified edge of the form model, the discretization of the modified edge of the form model comprising nodes on the modified edge that correspond to projections of the nodes on the original edge of the form model; and performing automated structural analysis of a mesh discretization of the form that is based on the discretization of the modified edge or is based on a correspondence between the discretization of the modified edge and the discretization of the original edge.

\* \* \* \* \*